(12) United States Patent
Corona

(10) Patent No.: US 6,305,739 B1
(45) Date of Patent: Oct. 23, 2001

(54) PULL-OUT DEVICE AND A CAMPING CAR PROVIDED WITH SUCH DEVICE

(75) Inventor: Stefan Corona, Dornbirn (AT)

(73) Assignee: Fulterer Gesellschaft m.b.H, Lustenau (AT)

(*) Notice: Subject to any disclaimer, the term of this patent is extended or adjusted under 35 U.S.C. 154(b) by 0 days.

(21) Appl. No.: 09/690,220

(22) Filed: Oct. 17, 2000

(30) Foreign Application Priority Data

Oct. 18, 1999 (AT) ...................................... 1753/99

(51) Int. Cl.7 ...................................... B60P 3/34
(52) U.S. Cl. ............... 296/165; 296/26.13; 52/67; 384/50
(58) Field of Search ............... 296/26.01, 26.03, 296/26.08, 26.09, 26.12, 26.13, 165, 171, 172, 176; 52/67; 384/19, 50, 53, 7; 312/334.33, 334.39

(56) References Cited

U.S. PATENT DOCUMENTS 1,315,922 * 9/1919 Franklin ...................... 312/334.39 X
2,842,972 * 7/1958 Houdart ...................... 296/26.13 X
5,332,276 * 7/1994 Bladgett, Jr. ...................... 296/26.13

* cited by examiner

Primary Examiner—Dennis H. Pedder
(74) Attorney, Agent, or Firm—Sidley Austin Brown & Wood, LLP (57) ABSTRACT

A pull-out device including a stationary rail having at least one support roller in its front end region, a pull-out rail supported on the stationary rail and displaceable over the at least one support roller upon being pulled out, and having at least one running roller provided in a rear end region of the pull-out rail and displaceable, upon pulling out of the all-out rail, along an overhanging flange of the stationary rail that defines a running surface, with the length of the pull-out rail being greater than a length of the stationary rail and extending, in the drawn-in position, beyond the rear end of the stationary rail, with the at least one running roller lying outside of the running surface, and with the pull-out device including a support element provided in a rear region of the stationary rail for supporting the pull-out rail in its drawn-in position.

14 Claims, 8 Drawing Sheets

PULL-OUT DEVICE AND A CAMPING CAR PROVIDED WITH SUCH DEVICE

BACKGROUND OF THE INVENTION

1. Field of the Invention

The present invention relates to a pull-out device including a stationary rail, at least one support roller provided in a front end region of the stationary rail, a pull-out rail supported on the stationary rail and displaceable over the at least one support roller upon being pulled out, and at least one running roller provided in a rear end region of the pull-out rail and displaceable, upon pulling out of the pull-out rail, along an overhanging flange of the stationary rail that defines a running surface. The present invention also relates to a camping car having at least one such pull-out device for displacing a pull-out section of at least one side wall of the car.

2. Description of the Prior Art

A pull-out device of a type described above is disclosed, e.g., in European Publication EP O 809 956A which disclosed a pull-out device for a tall cupboard. It is also known to provide pull-out devices of a type described above for displacing box-shaped side sections forming part of side walls of camping cars.

However, with conventional pull-out devices used for pulling out of the pull-out sections of side walls of the camping car, the stationary rail forms an obstacle in the pull-out position of the side section(s). When a space behind the pull-out section(s) need be used, the rear ends of the stationary rails in this space form barriers over which the car user can easily stumble.

Accordingly, an object of the present invention is to provide a pull-out device of a type described above devoid of the above-mentioned drawback.

SUMMARY OF THE INVENTION

This and other objects of the present invention, which will become apparent hereinafter, are achieved by providing a pull-out device having a pull-out rail the length of which is greater than the length of the stationary rail and which extends, in the drawn-in position of the pull-out device, beyond the rear end of the stationary rail, with the at least one running roller lying outside of the running surface, with the pull-out device being supported on a support element provided in the rear region of the stationary rail for supporting the pull-out rail in the drawn-in position.

In the pull-out position of the device, the stationary rail extends only slightly into the space, which was occupied by the pull-out section, with the bottom of the space being practically free of any obstacles. The device is very economical as less material is required for the relatively short stationary rail.

In a preferred embodiment of the invention, the support element has at least one roller over which the pull-out rail is displaced during a first phase of the pull-out when the running roller(s) is (are) outside of the running surface(s) of the stationary rail. When the friction is of no importance during this phase, instead of a roller(s), a slide bearing member can be provided.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

A pull-out device according to the present invention, which is shown in FIGS. 1–7, includes a stationary rail 1 and a pull-out rail 2. The stationary rail 1 is formed of two substantially C-shaped profiles 3 and 4 having their respective closed sides facing each other. The two C-shaped profiles 3 and 4 are connected with each other in the region of their front ends by a cross-bolt 5 and in their rear region by a support device 6 which will be described in detail further below. The side overhanging flanges of the profiles 3 and 4 form, respectively, running surfaces for both running rollers 7 and 8 of the pull-out rail. The lower, extending outwardly flanges of the profiles 3 and 4 have an increased length and form, respectively, attachment flanges of the stationary rail 1. In the region of the front end 16 of the stationary rail 1, the upper, extending outwardly flanges of the C-shaped profiles 3 and 4 are recessed, with support rollers 14 and 15 being arranged on the vertical webs of the C-profiles 3 and 4. The running sections of the rollers 13 and 14 project somewhat above the upper end of the respective C-shaped profiles 3 and 4 and roll along the pull-out rail during a pull-out.

The pull-out rail 2 has a U-shaped cross-section, with both legs 11, 12 of the pull-out rail 2 extending downwardly on outer sides of the C-shaped profiles 3 and 4. In the region of the rear end 13 of the pull-out rail 2, the legs 11, 12 carry, on their sides facing the C-shaped profiles 3 and 4, respective running rollers 7 and 8.

Figure 1:
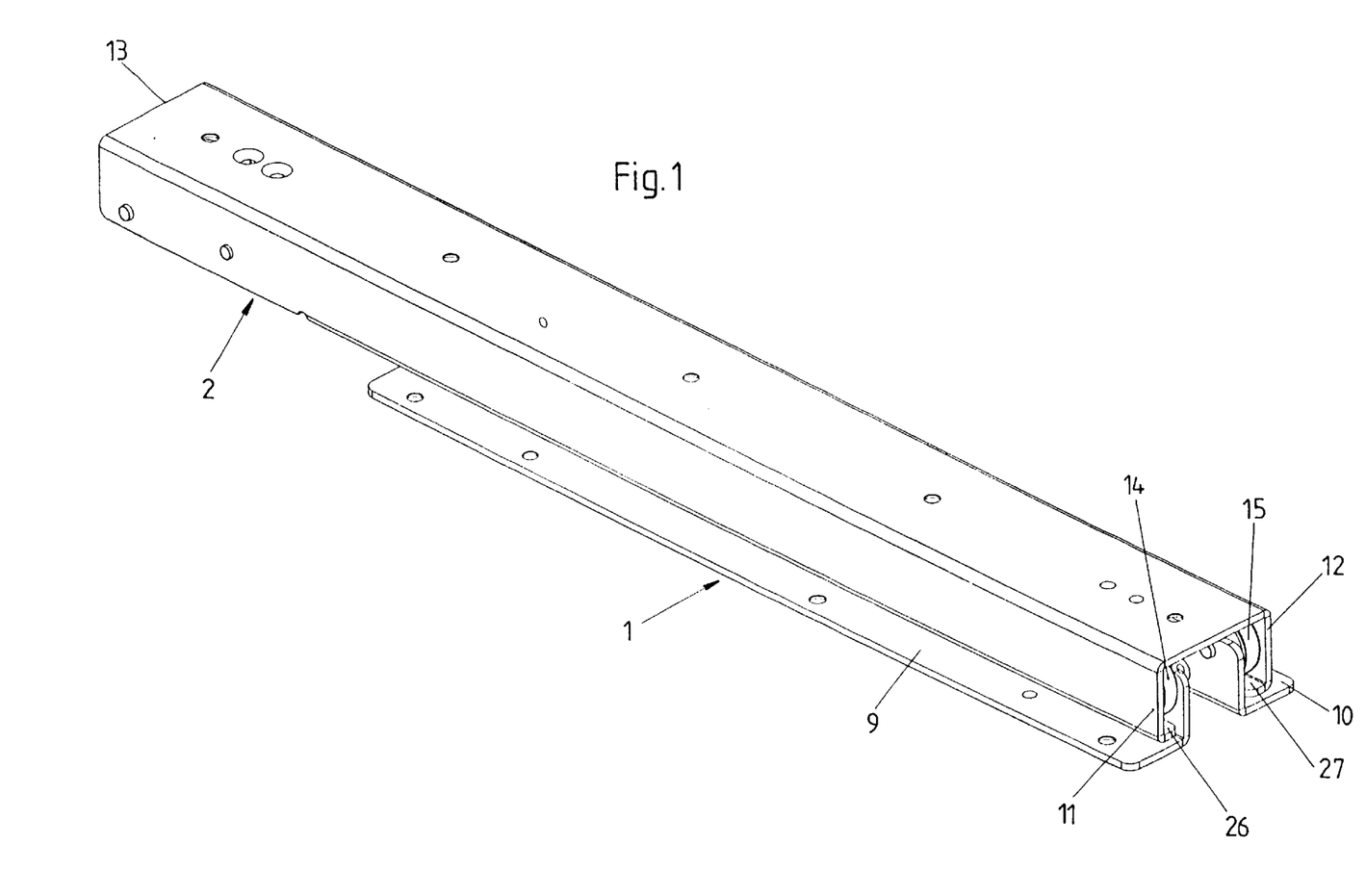
FIG. 1 a top perspective angular view of a pull-out device according to the present invention in its completely drawn-in position.
Figure 2:
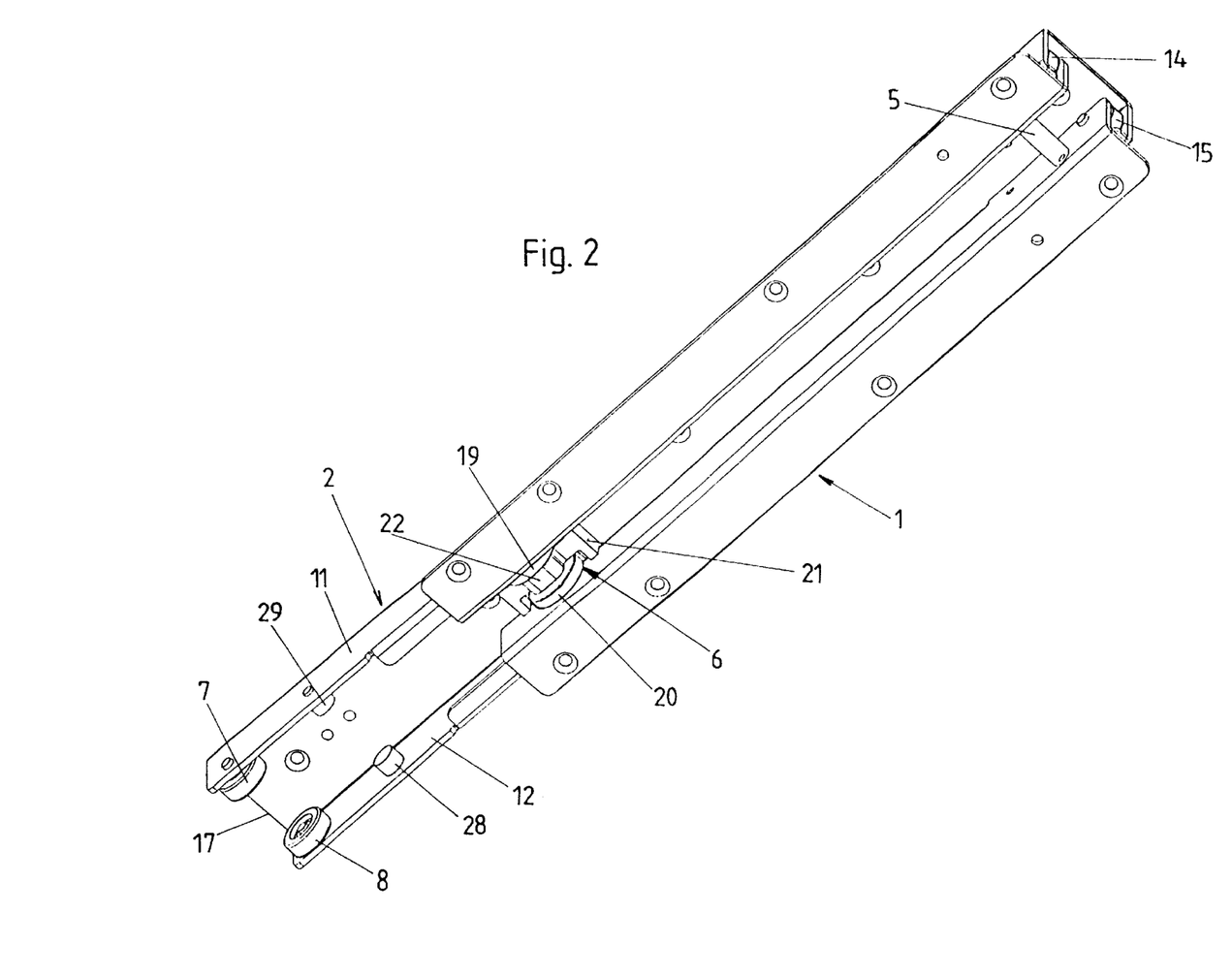
FIG. 2 a bottom perspective angular view of a pull-out device according to the present invention in its completely drawn-in position.
Figure 3:
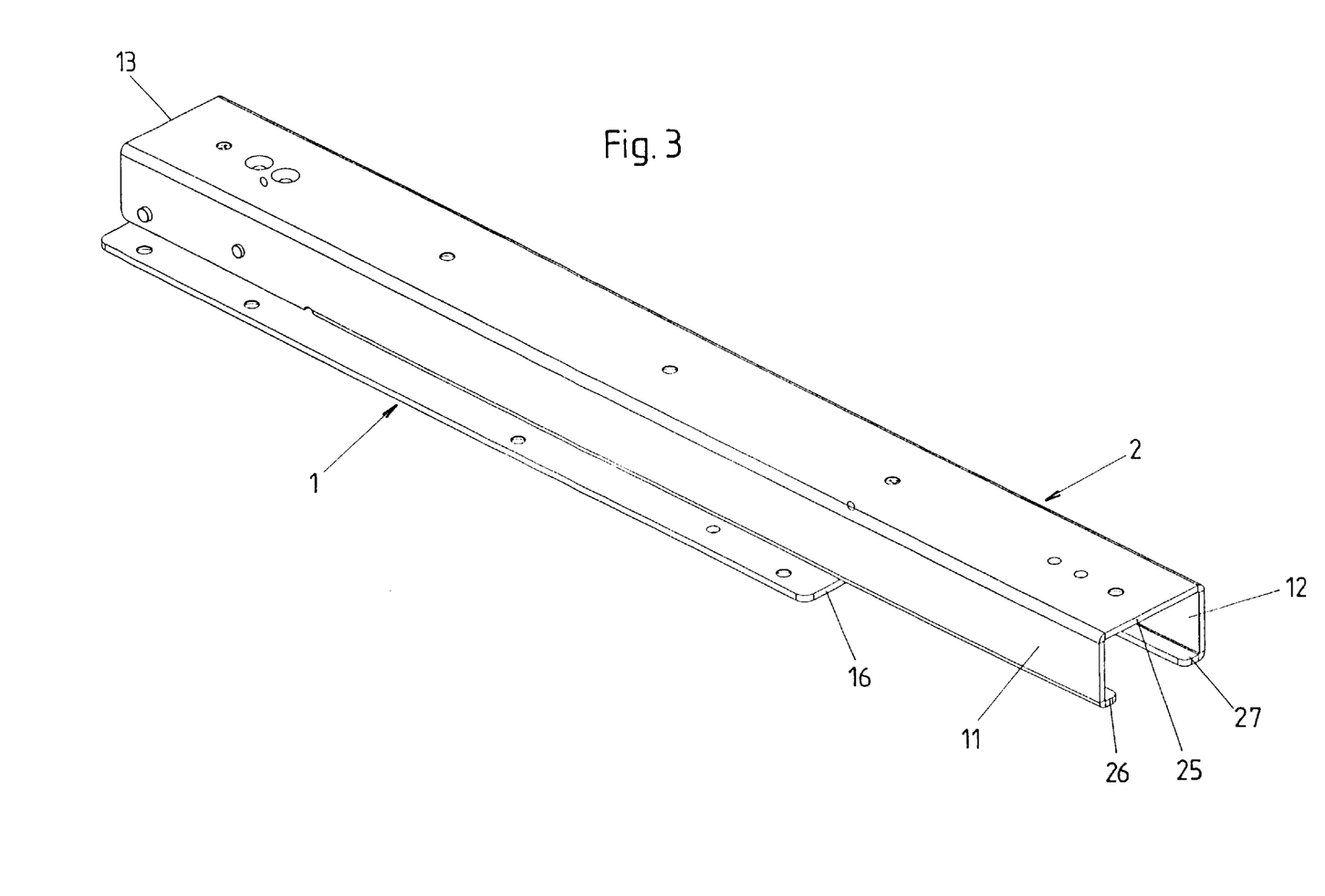
FIG. 3 a top perspective angular view of a pull-out device according to the present invention in its partially pull-out position.
Figure 4:
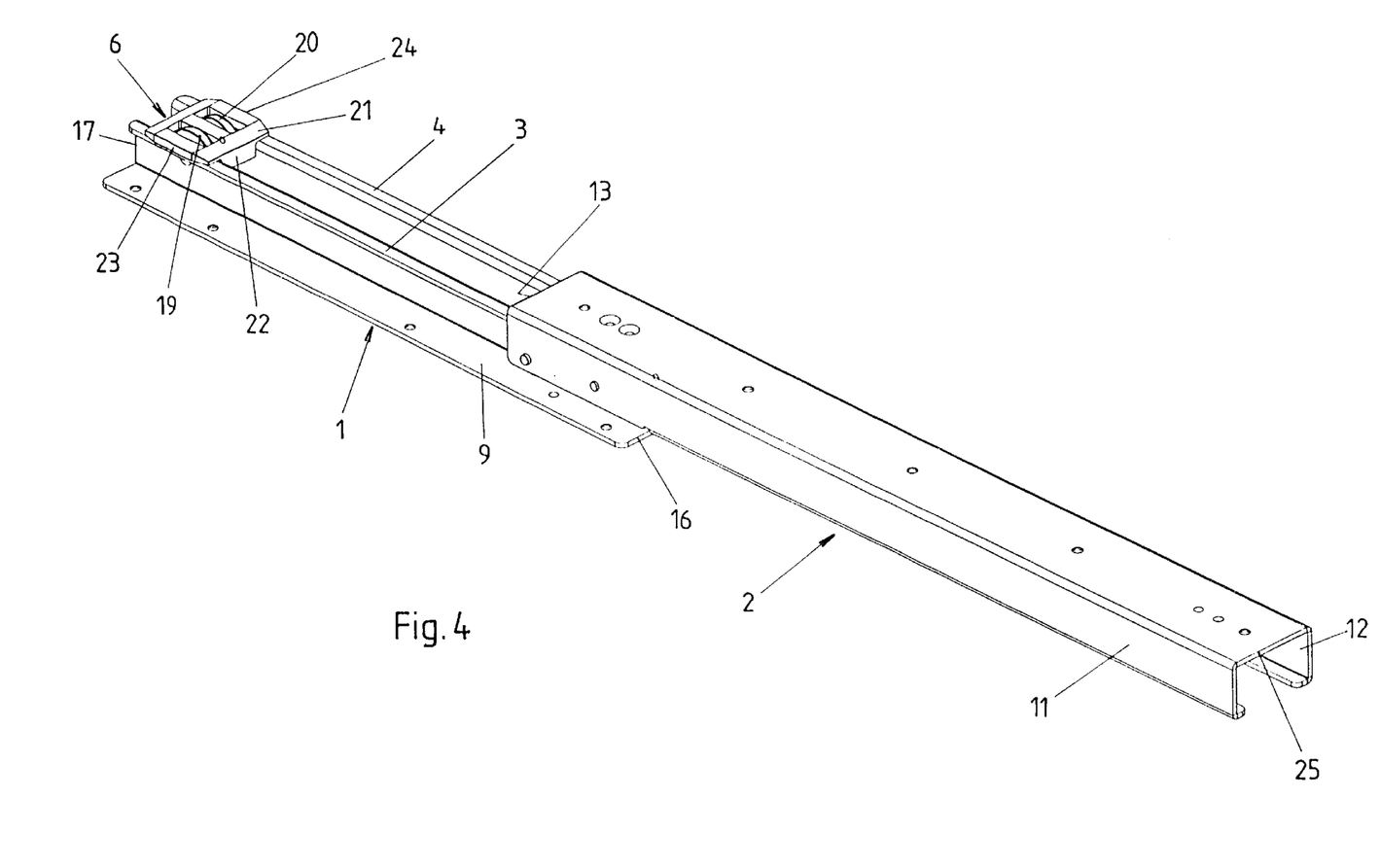
FIG. 4 a top perspective angular view of a pull-out device according to the present invention in its completely pull-out position.
Figure 5:
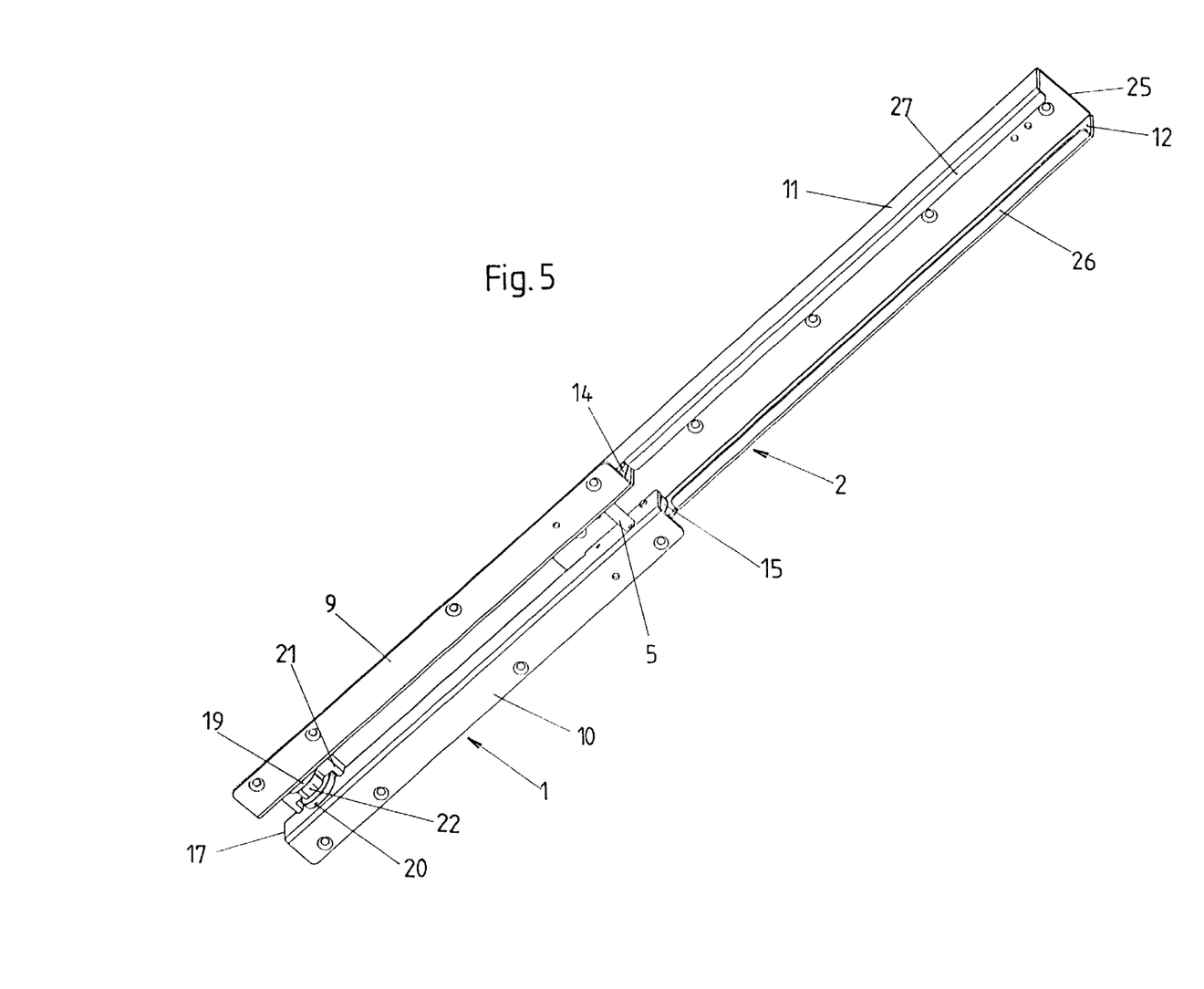
FIG. 5 a bottom perspective angular view of a pull-out device according to the present invention in its completely drawn-in position.
Figure 6:
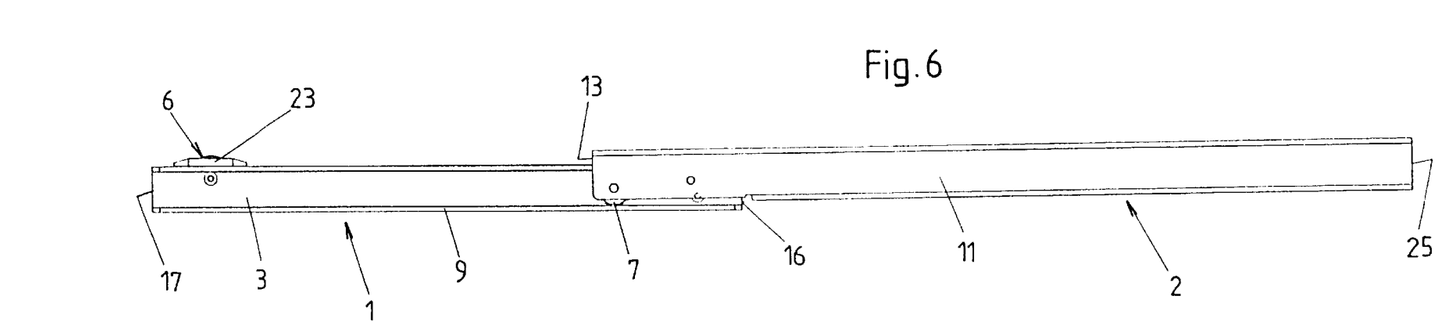
FIG. 6 a side view of a pull-out device according to the present invention in its completely pull-out position.
Figure 7:
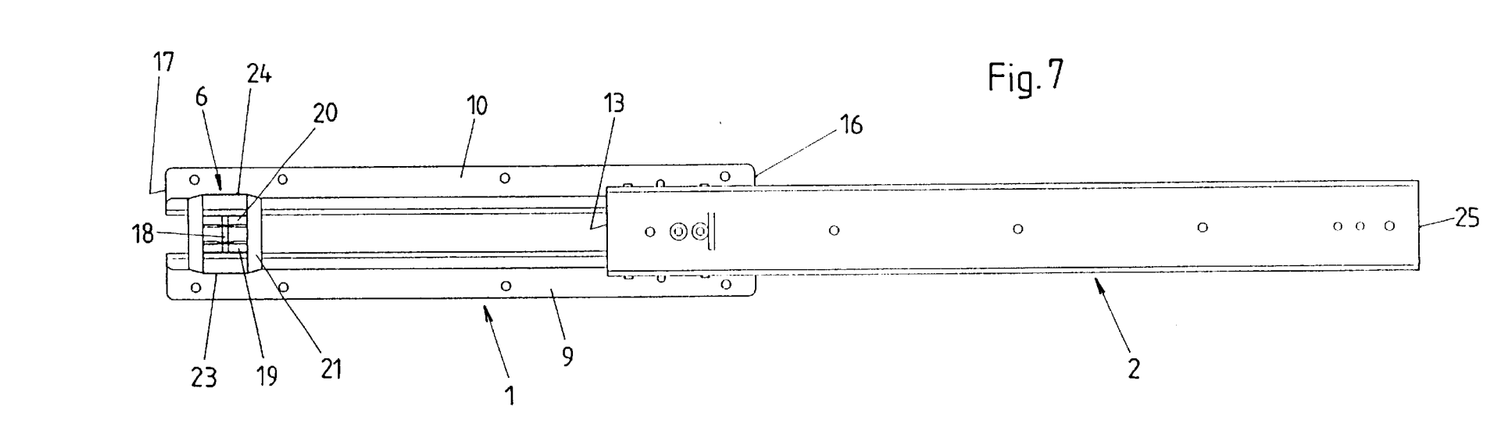
FIG. 7 a top view of a pull-out device according to the present invention in its completely pull-out position.

In the completely drawn-in position of the pull-out device, which is shown in FIGS. 1–2, the rear region of the pull-out rail projects past the stationary rail 1 by a length in excess of 30 percent of the length of the stationary rail, and the running rollers 7,8 are located outside of the running surfaces of the C-shaped profiles 3 and 4. In this position, the pull-out rail is supported, in the region of the rear end 17 of the stationary rail 1, by the support device 6. To this end, the support device 6 includes two rollers 19, 20 which project somewhat beyond the upper edges of the C-shaped profiles 3, 4. The running rollers 7 and 8 are supported on an axle 18 that connects both profiles 3 and 4 in the rear end of the stationary rail 1. The support device 6 has a guide 21 that overlaps both C-shaped profiles 3-4 and has recesses accommodating the running rollers. The guide 21 is further provided with an extension 22 having a bore through which the axle 18 extends. The side surfaces 23, 24 of the support device 6, which are located further outwardly then the outwardly extending flanges of the C-profiles 3 and 4, form side guides for the pull-out rail 2.

In order to prevent downward tilting of the pull-out rail 2 at its rear region about the support device 6 as a pivot joint in the completely drawn-in position of the pull-out device, which is shown in FIGS. 1–2, when a load is applied to the pull-out rail rear region, there are provided on the legs 11, 12 at least in the front region 25 of the pull-out rail 2, inwardly extending collars 26, 27 for engaging the support rollers 14, 15, respectively. Alternatively, the pullout rail 2 can be provided in its front region 25 with a downwardly extending hook-shaped catch for engaging the cross-bolt 5 in the completely drawn-in position of the pull-out device.

Upon the pull-out device being pulled-out from its completely drawn-in position shown in FIGS. 1–2, the pull-out rail 2 rolls over the rollers 19, 20 of the support device 6. In the partially pulled out position of the pull-out device shown in FIG. 3, the running rollers 7, 8 already lie on the running surfaces of the C-profiles 3 and 4. To facilitate entry of the running rollers 7 and 8 in the region of the running surfaces of the C-profiles 3, 4, the rollers 19, 20 of the support device 6 extend above the upper edges of the C-profiles 3 and 4 by a distance such that the pull-out rail is lifted by the rollers 19, 20 so that the running rollers 7, 8 are lifted by a half of the gap between them and the running surfaces with respect to the lower flanges of the C-profiles 3, 4. After further pull-out of the pull-out device, when the rear end 13 of the pull-out rail 2 is pulled over the rollers 19, 20, the rollers 7, 8 descend onto the lower flanges of the C-profiles 3, 4 and roll therealong in a direction toward the front end 16 of the stationary rail 1. At a certain point of the pull-out which depend on load distribution over the pull-out rail 2, the front end 25 of the pull-out rail 2 tilts over the support rollers 14, 15 as a pivot point downwardly, and the rollers 7,8 engage the upper flanges of the C-profiles 3, 4, rolling therealong further in the direction of the front end 16 of the stationary rail. A maximum pull-out, which is shown in FIGS. 4–7 is reached when the stops 28, 29, which are provided on the pull-out rail 2, engage the support rollers 14, 15.

Figure 8:
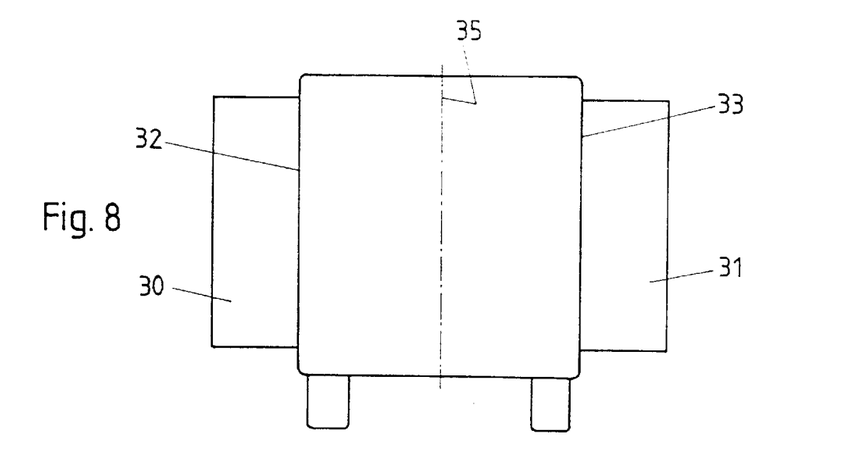
FIG. 8 a schematic rear view of a camping car with a pull-out side wall section.
Figure 9:
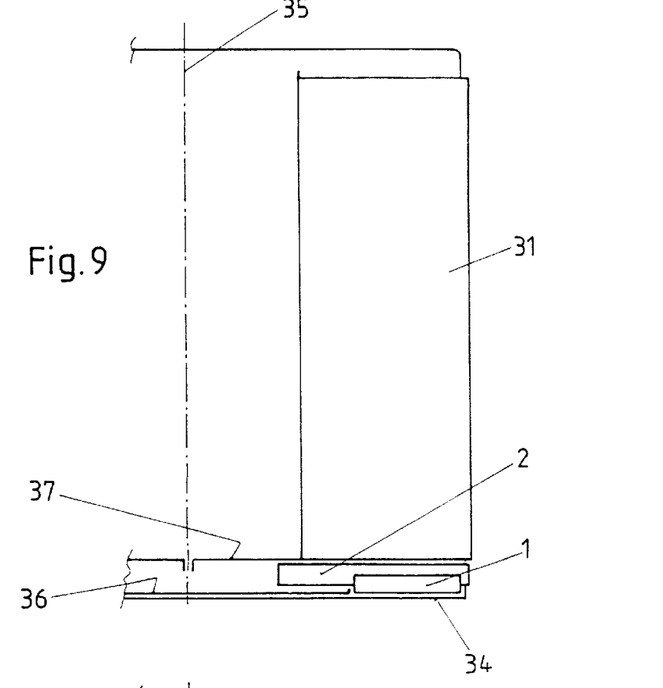
FIG. 9 a cross-sectional view of portion of the camping car shown in FIG. 8 with a drawn-in right section.
Figure 10:
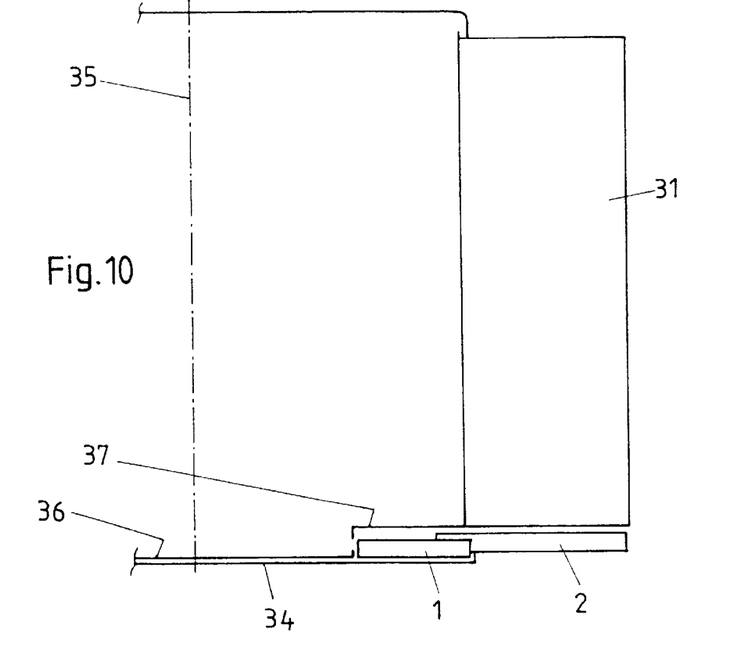
FIG. 10 a cross-sectional view of portion of the camping car shown in FIG. 8 with a pull-out right section.

FIG. 8 shows schematically a rear view of a camping car the side sections 30, 31 of the side walls 32, 33 of which are pulled out. FIGS. 9 and 10, as discussed above, show only the right section 31 in its drawn-in and pull-out positions, respectively. As shown schematically in FIG. 11, beneath each of the side sections 30, 31, there are arranged two pull-out devices according to the present invention. As shown in FIGS. 9–10, the shorter stationary rails 1 are secured to the bottom 34 of the car (only one rail 1 associated with the section 31 is shown). The bottoms 35 of the pull-out sections 30, 31 extend past the rear ends 17 of respective pull-out rails 2 and, in the completely drawn-in position, reach the center plane of the car. The bottom covering 36 extends beneath the rear, projecting end 17 of the pull-out rail 2 up to the rear end of the stationary rail 1. In the completely pull-out position of the pull-out rails 2, the rear ends of bottoms 37 of the side sections 30, 31 coincide with the rear ends of the stationary rails 1. Thus, in the plan view, the bottom 37, together with covering 36, form a continuous bottom surface. This surface, viewed in a longitudinal direction of the car, has no disturbing transverse barriers.

Figure 11:
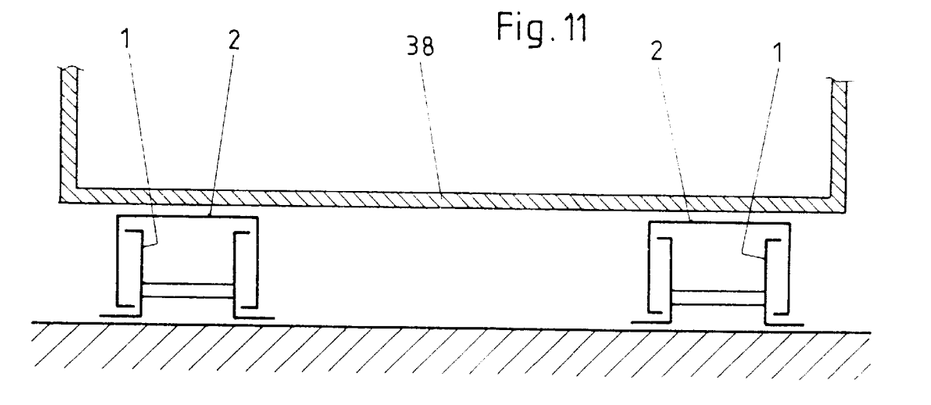
FIG. 11 a schematic cross-sectional view of a first embodiment of a pull-out device according to the present invention with pull-out sections of the camping car carried thereby.
Figure 12:
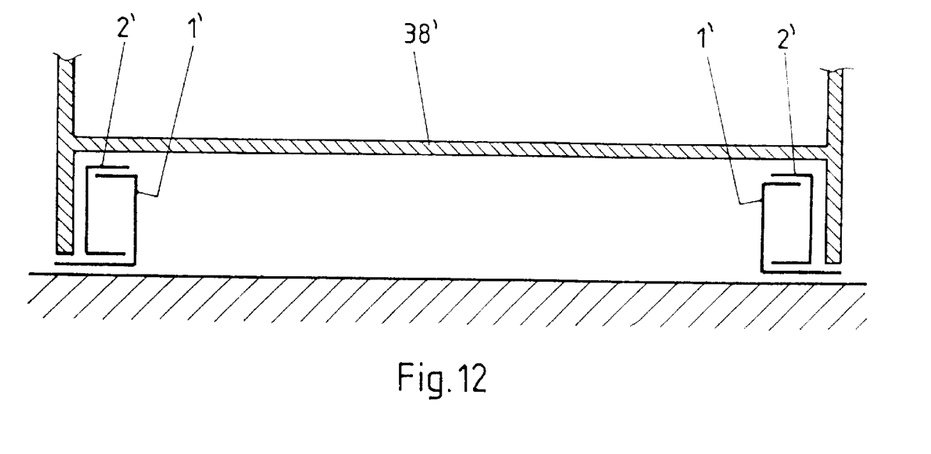
FIG. 12 a schematic cross-sectional view of a second embodiment of a pull-out device according to the present invention with pull-out sections of the camping car carried thereby.

FIGS. 11–12 show two embodiments of a pull-out device according to the present invention. In the drawings, respectively, the pull-out sections 38, 38$^1$ are secured on the left and right pull-out rails 2, 2$^1$ which are supported on the stationary rails 1, 1$^1$ and are displaceable therealong. The pull-out device shown in FIG. 1 is the same device as was described above. In the pull-out device shown in FIG. 12, the stationary rail 1$^1$ is formed of a single C-shaped profile. The pull-out rail 2$^1$ is likewise formed of a single C-shaped profile. The open sides of the stationary and pull-out rails 1$^1$ and 2$^1$ face each other, with the upper and lower flanges of the pull-out rail 2$^1$ lying, respectively, above the upper and lower flanges of the stationary rail 1$^1$. The two pull-out devices shown in FIG. 12 correspond substantially to a separate pull-out device shown in FIG. 11 separated along its middle longitudinal plane. The running rollers, support rollers, support devices, and other details of a pull-out device are not shown in FIGS. 11–12, but they are similar to those shown in FIGS. 1–7.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments with the spirit and scope of the present invention as defined by the appended claims.

What is claimed is:

1. A pull-out device, comprising a stationary rail; at least one support roller provided in a front end region of the stationary rail; a pull-out rail supported on the stationary rail and displaceable over the at least one support roller upon being pulled out; and at least one running roller provided in a rear end region of the pull-out rail and displaceable, upon pulling out of the pull-out rail, along an overhanging flange of the stationary rail that defines a running surface, wherein the pull-out rail has a length greater than a length of the stationary rail and extends in a drawn-in position thereof, beyond a rear end of the stationary rail, with the at least one running roller lying outside of the running surface, and wherein the pull-out device further comprises support means provided in a rear region of the stationary rail for supporting the pull-out rail in the drawn-in position thereof.

2. A pull-out device as set forth in claim 1, wherein the support means comprises at least one roller along which the pull-out rail rolls off in a first phase of pull-out when the at least one running roller is located outside of the running surface.

3. A pull-out device as set forth in claim 1, wherein the support means comprises slide bearing means along which the pull-out rail slides in a first phase of a pull-out when the at least one running roller is located outside of the running surface.

4. A pull-out device as set forth in claim 1, wherein the support means comprises side guide means for guiding the pull-out rail in a first phase of a pull-out when the at least one running roller is located outside of the running surface.

5. A pull-out device as set forth in claim 1, wherein the stationary rail is formed of two substantially C-shaped profiles connected with each other and having closed sides thereof facing each other, and wherein the pull-out device comprises two running rollers provided in the rear end of the pull-out rail, the two C-profiles defining, respectively, running surfaces for the two running rollers.

6. A pull-out device as set forth in claim 5, wherein the support means comprises at least one roller along which the pull-out rail rolls off in a first phase of pull-out when the at least one running roller is located outside of the running surface, and wherein the two C-shaped profiles are connected by an axle for supporting the at least one roller of the support means.

7. A pull-out device as set forth in claim 5, wherein the pull-out rail is formed as a U-shaped rail, with both legs of the U-shaped rail extending downward on outer sides of respective C-shaped profiles, and wherein the pull-out device comprises two said running rollers each provided on sides of respective legs adjacent to respective C-shaped profiles.

8. A pull-out device as set forth in claim 7, wherein both legs are provided, at least in regions thereof adjoining a front end of the pull-out rail, with downwardly extending projections for engaging +hat least one support roller.

9. A pull-out device as set forth in claim 1, wherein the length of the pull-out rail exceeds the length of the stationary rail by more than 20%.

10. A pull-out device as set forth in claim 9, wherein the length of the pull-out rail exceeds the length of the stationary rail by more than 30%.

11. A camping car, comprising at least one side wall having a pull-out section; and a pull-out device supporting the pull-out section, the pull-out device including a stationary rail secured to a car body, at least one support roller provided in a front end region of the stationary rail, a pull-out rail for supporting the pull-out section and supported on the stationary rail and displaceable over the at least one support roller upon being pulled out, and at least one running roller provided in a rear end region of the pull-out rail and displaceable, upon pulling out of the pull-out rail, along an overhanging flange of the stationary rail that defines a running surface, the pull-out rail having a length greater than a length of the stationary rail and extends, in a drawn-in position thereof, beyond a rear end of the stationary rail, with the at least one said running roller lying outside of the running surface, and the pull-out device further including support means provided in a rear region of the stationary rail for supporting the pull-out rail in the drawn-in position thereof.

12. A camping car as set forth in claim 11, wherein the pull-out section has a bottom secured to the pull-out rail and extending past the rear end of the pull-out rail up to a middle plane of the car.

13. A camping car as set forth in claim 11, wherein the camping car has a bottom covering which, in the drawn-in position of the pull-out section extends under the rear end of the pull-out rail up to a rear end of the stationary rail.

14. A camping car as set forth in claim 11, wherein both side walls have pull-out sections, the camping car comprising two pull-out devices for displacing the two pull-out sections.

\* \* \* \* \*